United States Patent
Duarte et al.

(10) Patent No.: US 9,148,221 B1
(45) Date of Patent: Sep. 29, 2015

(54) OPTICAL DATA LINK

(71) Applicants: George M. Duarte, Saunderstown, RI (US); Javier A. Rinaldi, Middletown, RI (US); Jonathan S. Preston, Ashaway, RI (US)

(72) Inventors: George M. Duarte, Saunderstown, RI (US); Javier A. Rinaldi, Middletown, RI (US); Jonathan S. Preston, Ashaway, RI (US)

(73) Assignee: The United States of America as represented by the Secretary of the Navy

( * ) Notice: Subject to any disclaimer, the term of this patent is extended or adjusted under 35 U.S.C. 154(b) by 53 days.

(21) Appl. No.: 14/088,941

(22) Filed: Nov. 25, 2013

(51) Int. Cl.
*H04B 10/00* (2013.01)
*H04B 10/25* (2013.01)
*H04B 10/2575* (2013.01)

(52) U.S. Cl.
CPC .................. *H04B 10/2504* (2013.01)

(58) Field of Classification Search
CPC ..................... H04B 10/25; H04B 10/2575
USPC ................... 398/109, 110, 116, 141, 164
See application file for complete search history.

(56) References Cited

U.S. PATENT DOCUMENTS

| | | | | |
|---|---|---|---|---|
| 4,831,662 | A * | 5/1989 | Kuhn | 398/192 |
| 5,231,611 | A * | 7/1993 | Laznicka, Jr. | 367/149 |
| 6,526,212 | B1 * | 2/2003 | Mishriky et al. | 385/138 |
| 7,696,901 | B2 * | 4/2010 | Wilson et al. | 340/854.7 |
| 2003/0223756 | A1 * | 12/2003 | Tatum et al. | 398/135 |
| 2005/0184260 | A1 * | 8/2005 | Fageraas et al. | 250/573 |
| 2008/0159687 | A1 * | 7/2008 | Donlagic et al. | 385/13 |
| 2008/0317427 | A1 * | 12/2008 | Rosiewicz | 385/138 |
| 2013/0041235 | A1 * | 2/2013 | Rogers et al. | 600/306 |
| 2013/0336656 | A1 * | 12/2013 | Belansky et al. | 398/79 |

* cited by examiner

*Primary Examiner* — Dalzid Singh
(74) *Attorney, Agent, or Firm* — James M. Kasischke; Michael P. Stanley

(57) ABSTRACT

A system for optical communication through a structure includes a light pipe extending from one side of the structure to another. A sensor in communication with one side of the structure is capable of producing a sensor signal responsive to an environmental condition. Transmitter electronics are joined to the sensor for producing an electrical signal. A light source is joined to the transmitter electronics and to the light pipe to provide an optical signal. An optical detector receives the optical signal from the light pipe on the other side of the structure. Receiver electronics are joined to the optical detector and provide an output signal.

9 Claims, 3 Drawing Sheets

OPTICAL DATA LINK

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to an optical data system and, more particularly, to an optical data link system for communicating information through a structure.

(2) Description of the Prior Art

There is a need to pass information between a first environment and a second environment while meeting safety requirements intended to prevent communication of fluids between the environments. The structure separating the environments can be a wall or a door. Of course, a passage can be created in the structure through which electrical wires and/or fiber cables can be fed. Such systems, however, suffer from limitations such as the potential exposure of the one environment to the conditions in the other environment through the passage. That is, movement of the wires and/or cables can break a seal between the environments.

As one example, U.S. Patent Publication No. 2011/0280538 discloses a pressure resistant media converter apparatus that utilizes a hermetic electrical feedthrough and a hermetic optical feedthrough. Electrical wires pass through the hermetic electrical feedthrough and optical fibers pass through a hermetic optical feedthrough. The feedthrough configuration, however, creates the situation where movement of the wires and/or fibers might break the hermetic seal and thereby exposing the inner chamber to the outer chamber conditions.

As another example, U.S. Patent Publication No. 2007/0003207 discloses a pressure transducer with an optical waveguide feedthrough assembly that interprets signals generated by sensors to allows real-time monitoring of the state of the feedthrough assembly. These sensors, however, monitor the state of the feedthrough assembly rather than a condition within an inner chamber.

A radio connection could be used in some environments for this solution; however, in many situations it is desirable to have a metallic structure separating the environments. These metallic structures are impenetrable to radio waves. It may also be undesirable to have radio waves within a structure because such waves could interfere with other operations within a structure.

One application requiring passage of information from one environment to another is in submarine operations. The exterior of a submarine hull can be subjected to liquid environments at much higher pressures than the gaseous environment on the interior of the hull. This often occurs with submarine launch tubes. The interior of the launch tube can be open to either the exterior environment or the interior environment. There are preexisting light pipes that allow visual inspection of the interior of a launch tube. Accordingly, it is desirable to transmit sensor readings from the interior of a launch tube to the exterior of the launch tube.

Thus, there is a need for an improved device for providing a data link through structure to communicate information such as, for example, a sensed condition in another environment, such as is identified in the present application.

SUMMARY OF THE INVENTION

Accordingly, it is an object to provide a system that allows pressure or other measurement information to be transmitted through a structure.

It is a further object to provide a system that can be retrofit to a structure equipped with an optical inspection port that allows measurement information to be transmitted through the structure.

According to a first illustrative example, an optical data link system is provided. The system includes a light pipe configured to extend through an opening in a structure that separates one side of the structure from the other, the light pipe includes an optical medium configured to pass an optical signal between the sides. A transmitter assembly is configured to sense a condition one side and generate an optical signal indicative of the sensed condition. The optical signal is provided to optical medium in the light pipe so as to transmit the optical signal. A receiver assembly is provided in optical communication with the optical medium on the other side of the structure. The receiver assembly receives the optical signal and decodes the signal to extract the information indicative of the sensed condition.

Certain aspects provide for the transmitter assembly to include a sensor or transducer that senses the condition on one side of the structure and a light source that generates the optical signal. The sensed condition may be one or more of a pressure, a temperature, a humidity level, a salinity level, a specific chemical, an acoustic signal, and a vibration.

The transmitter assembly may further include a plurality of sensors configured to sense different conditions. The transmitter assembly can be configured to generate different optical signals indicative of and corresponding to each of the sensed conditions. The light pipe may be configured to pass through the structure and be secured such that the environmental conditions on one side of the structure are isolated from the environmental conditions on the other side.

According to some aspects, the transmitter assembly may further include an electronics module with a transducer configured to sense the condition and generate an electrical signal indicative of the sensed condition and an optical transmitter configured to receive the electrical signal and generate the optical signal based on the electrical signal.

The receiver assembly includes an optical detector configured to receive the optical signal and generate an electrical signal indicative of the optical signal and an electronics module configured to receive the electrical signal and generate an output signal indicative of the sensed condition in the inner chamber. The output signal can be an analog signal or a digital signal. The structure may be a torpedo tube breech door.

According to certain aspects, The optical signal may comprises a light being transmitted through the optical medium at a wavelength based on a physical size of the optical medium so as to achieve total internal reflection. Additionally, or alternatively, the optical signal may comprise a light being transmitted through the optical medium at a wavelength that is not based on a physical size of the optical medium. As one example, the information indicative of the sensed condition may be encoded in the light as a series of pulses having a duty cycle dependent on the sensed condition. The optical signal may have a wavelength in the infrared spectrum, or some other wavelength.

The output signal can be joined to a monitoring system which can indicate the sensed condition via one or more of a visual display, a printout, a dial indicator, and a manometer. The structure may be a torpedo tube breech door and the other environment may be the torpedo tube interior. The environmental condition may be a pressure, a temperature, a humidity level, a salinity level, an acoustic signal, and/or a vibration in the other environment. The environmental condition may be a hydrostatic pressure within the inner chamber.

The system can further provide a transmitter assembly and receiver assembly that can be fitted on an existing light pipe in a structure. The components of each assembly can be contained within a housing, and the housing can be mounted on the structure or on the light pipe.

Other objects and advantages of the present invention will be apparent to those having ordinary skill in the art reading the instant specification, drawings, and appended claims.

BRIEF DESCRIPTION OF THE DRAWINGS

A further understanding of the nature and advantages of the present invention can be realized by reference to the following drawings. In the appended figures, similar components or features may have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes can be made in the function and arrangement of elements.

Thus, various embodiments may omit, substitute, or add various procedures or components as appropriate. For instance, it should be appreciated that the methods can be performed in an order different than that described, and that various steps can be added, omitted or combined. Also, aspects and elements described with respect to certain embodiments can be combined in various other embodiments. It should also be appreciated that the following systems, methods, devices, and software may individually or collectively be components of a larger system, wherein other procedures may take precedence over or otherwise modify their application.

Figure 1:
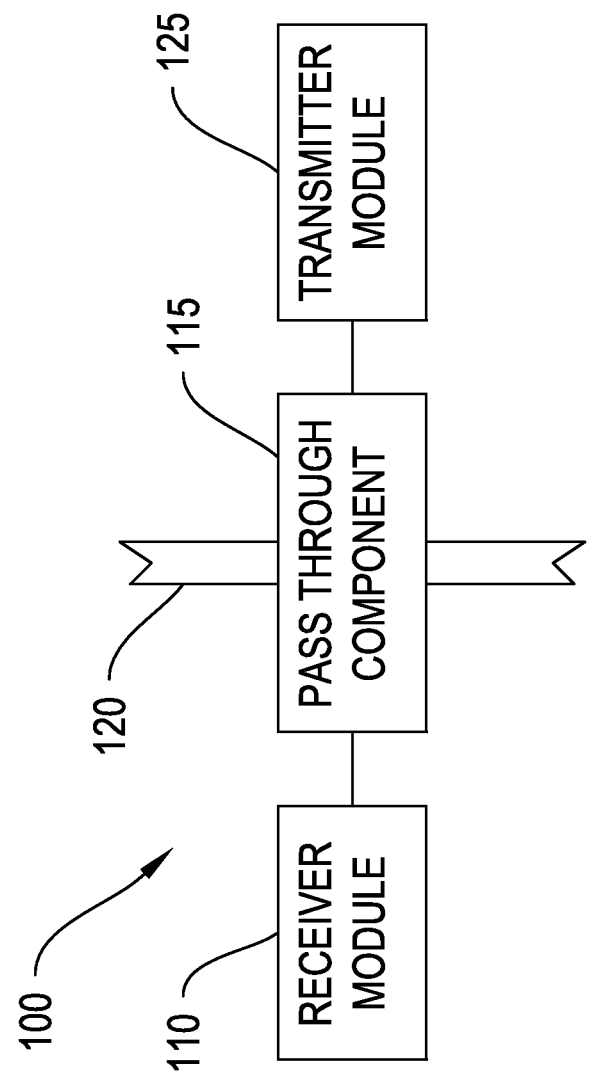
FIG. 1 is a block diagram of an example optical data link system including components configured according to various embodiments of the invention.

Referring now to the drawings, and more particularly to FIG. 1, shown therein is a block diagram of an exemplary optical data link system 100 constructed in accordance with aspects of the present disclosure. The system 100 includes a receiver module 110, an optical pass-through component or light pipe 115 that passes through (or is positioned within) a structure 120, and a transmitter module 125. It is to be understood that the structure 120 can be a door, a window, a wall, or the like. According to certain embodiments, the structure 120 may be part of a physical barrier that isolates a first chamber or compartment on one side of the structure 120 from the second chamber on the other side of the structure 120. The structure 120 may have a variety of thicknesses, shapes, sizes, etc. According to a particular embodiment, the structure can be a submarine launcher breech door that isolates the first chamber (e.g., the torpedo room) from a second chamber (e.g., the interior of the launch tube).

The light pipe 115 may be permanently or removably mounted to the structure 120 and extend though an opening in the structure 120. The light pipe 115 can be configured to maintain the physical barrier between the inner chamber and the outer chamber. That is, the light pipe can include one or more gaskets, sealants, predefined ridges or shapes, etc., that correspond to the shape and/or size of the structure 120 as well as the opening through the structure 120. A securing mechanism may be utilized to securely mount the light pipe 115 within the structure 120, e.g., nuts, weldments, locking pins, and the like. As such, the light pipe 115 securely seals the opening in the structure 120 to maintain the isolation between the inner chamber and the outer chamber.

The light pipe 115 may include an optical medium that extends along its length to permit the optical medium to pass an optical signal or light between the inner chamber and the outer chamber. According to certain embodiments, the optical medium may be an integral part of the light pipe 115. In some embodiments, the light pipe 115 may be a formed of a solid material (e.g., high strength steel, alloy, etc.) that has an opening formed through at least a portion of its inner diameter. The optical medium may be positioned in the opening and extend within the diameter of the light pipe 115. According to a preferred embodiment, the optical medium is permanently formed within the light pipe 115. The light pipe 115 may include an opening at opposing ends such that the optical medium positioned in the inner diameter can pass the optical signal through the light pipe 115. In some embodiments, the optical medium can extend along the inner diameter along the complete length of the light pipe 115. As such, it can be appreciated that the light pipe 115, when mounted in the structure 120, provides a positive isolation of the physical boundary between the inner chamber and the outside.

The optical medium may be formed of glass, silica, plastic, or some other material suitable for passing a light signal. In some embodiments, the optical medium is a single-mode fiber optic cable or a multi-mode fiber optic cable. The optical medium may pass a light signal having from one wavelength to a wide bandwidth of wavelengths. The optical medium may pass an optical signal in the infrared wavelength.

The transmitter module 125 may be positioned in the inner chamber and in optical communication with the light pipe 115. In some embodiments, the light pipe 115 and the transmitter module 125 may include corresponding fittings, connectors, and the like such that the transmitter module 125 is connected to the end of the light pipe 115. In other embodiments, the transmitter module 125 is positioned in the inner chamber and is configured to generate an optical signal (e.g., light signal) that can be received by, and pass through the optical medium.

The transmitter module 125 may include one or more modules, components, etc. that are configured to encode information and generate an optical signal indicative of the encoded information. In some aspects, the transmitter module 125 may receive an electrical signal from a separate component (not shown) that includes information to be encoded and passed through the light pipe 115. Additionally, or alternatively, the transmitter module 125 may generate the information to be encoded and transmitted. For instance, the transmitter module 125 may include one or more transducers configured to sense a condition within the inner chamber. The condition may be an environmental condition. Exemplary conditions include, but are not limited to a pressure of the inner chamber, a temperature of the inner chamber, a humidity level of the inner chamber, a salinity level of a liquid in the inner chamber, an acoustic signal within the inner chamber, a vibration within the inner chamber, and/or a hydrostatic pressure within the inner chamber. Other conditions and/or measurements may be sensed or determined and communicated using the presently disclosed systems.

In certain embodiments, the transmitter module 125 may include a plurality of sensors sensing different conditions within the inner chamber. In such embodiments, the transmitter module 125 may generate an optical signal (or a plurality of optical signals) that is encoded with information indicative of the sensed information. For example, the transmitter module 125 may generate a different optical signal for each sensed condition or encode different information into a single optical signal.

The receiver module 110 may be positioned on an opposing side of the light pipe 115 with respect to the transmitter module 125 (e.g., on an opposite side of the structure 120) and be in optical communication with the optical medium. The receiver module 110 may receive the optical signal being transmitted through the optical medium by the transmitter module 125. The receiver module 110 may include one or more modules, components, software instructions, etc., that are configured to receive the optical signal, decode or otherwise extract the information encoded therein, and provide an output signal indicative of the information. The output signal may be an analog signal or a digital signal.

The receiver assembly 110 may receive the optical signal and generate an electrical signal indicative of the information encoded in the optical signal. That is, the optical receiver 110 may include one or more components that receive the optical signal and differentiate changes in the amplitude, wavelength, duty cycle, etc., of the optical signal. In response to such changes, the receiver assembly 110 may include logic, hardware, etc., configured to extract the information encoded in the optical signal and generate an electrical signal indicative of the decoded information. Receiver assembly 110 may generate an output signal indicative of the decoded information, e.g., indicative of the sensed condition in the inner chamber. The receiver assembly 110 may generate the output signal as an analog signal or as a digital signal.

The receiver assembly 110 may further include logic, hardware, etc., that outputs the determined information. It can be appreciated that the receiver assembly 110 may output the information via a wide variety of forms. Exemplary forms of output include, but are not limited to, a display observable by a user, a printed output, a scale (e.g., pressure meter, bar graph, gauge, etc.), and the like, or combinations thereof. According to an even further example, the receiver assembly 110 may be configured to provide the output to an external system (not shown) via a wired and/or wireless communications system, e.g., via a WiFi signal, a cellular communications signal, and/or via a network connection. As such, the information encoded in the optical signal may be observable, recorded, communicated, etc., to one or more users.

Figure 2:
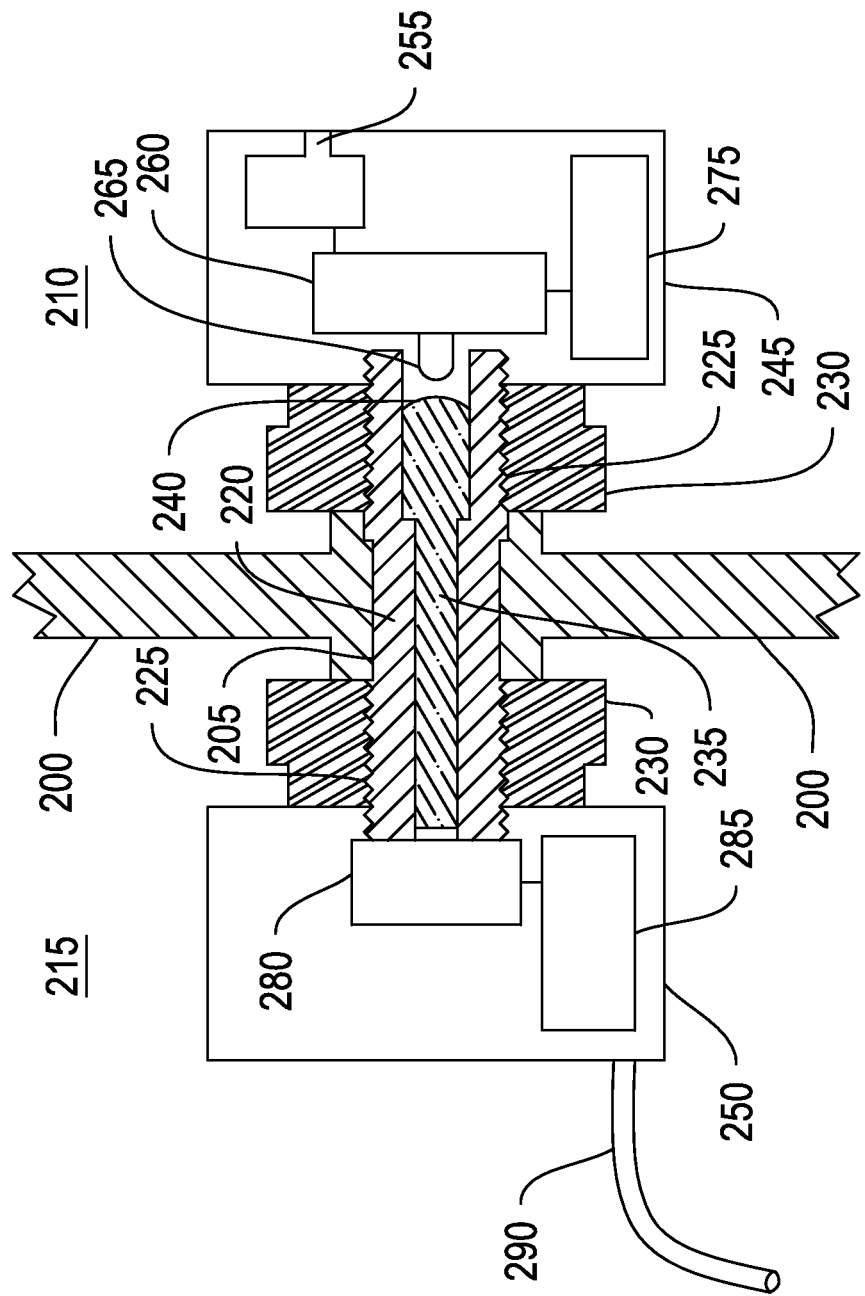
FIG. 2 is a diagram of an exemplary optical data link system including components configured according to various embodiments of the invention.

FIG. 2 provides a more practical embodiment of the block diagram of FIG. 1. A structure 200 separating environments is equipped with a light pipe 205 for visual inspection of a second side 210 of the structure from the first side 215. As shown the light pipe 205 includes a structural tube 220 sealed within an aperture penetrating the structure 200 from the first side 215 to the second side 210. The structural tube 220 can be threaded on the ends 225 extending beyond the first side 215 of the structure and the second side 210 of the structure. Nuts 230 can be provided on these threaded ends 225 to retain the structural tube 220 within the structure 200. In one embodiment threaded portions 225 of the structural tube 220 extend beyond the nuts 230 on the first and second sides of the structure. The structural tube 220 has an optical medium 235 positioned therein. Optical medium 235 provides an optical path allowing visual indication of conditions on the second side 210 from the first side 215 of the structure 200. In one embodiment, one end 240 of the optical medium can be curved for dispersion of light.

In order to convey information from the second side 210 of the structure 200 to the first side 215, there is provided an optical data link system. The optical data link system includes a transmitter assembly 245 for positioning on the second side 210 of the structure 200 and a receiver assembly 250 for positioning on the first side 215 of the structure 200. The transmitter and receiver assemblies can be mounted in a variety of different ways to the structure 200 and to the light pipe 205. The transmitter assembly 245 and the receiver assembly can include housings that contain the components therein and aid in mounting. The primary requirement is that each assembly be in visual communication with one end of the light pipe 220. In one embodiment the transmitter and receiver assemblies are mounted to the nuts 230 retaining the light pipe 205 within the structure 200. In another embodiment the assemblies are threaded on the ends 225 of the light pipe 205. In yet another embodiment, the assemblies are mounted to the structure 200 proximate the light pipe 205. The transmitter assembly 245 and receiver assembly 250 can be mounted using different means.

The transmitter assembly 245 includes a sensor 255 that is capable of being in communication with the environment on the second side 210 of the structure 200. The sensor 255 is electrically joined to transmitter electronics 260. The transmitter electronics 260 are joined to a light source 265 such as a light emitting diode, solid-state laser, fluorescent light, incandescent light or the like. The light source 265 can be placed in optical communication with the optical medium 235 within the light pipe 205. A lens or index matching gel may be necessary at 270 to enhance communication through the light pipe 205 if the end of the optical medium 235 is curved. A power supply 275 is joined to the transmitter electronics 260.

The sensor 255 can be any type of known electrical sensor. In one embodiment the sensor 255 is a transducer capable of detecting pressure on the second side of the structure. The sensor could also be a temperature sensor, chemical sensor or salinity sensor. The sensor 255 is joined to the transmitter electronics 260 which in a preferred embodiment converts the sensor output from an analog signal into a digital signal. The digital signal is provided to the light source 265. This signal can be serial, multiplexed or logical depending on the sensor 255. For example, a multiplexed or serial signal can be used to indicate a specific sensor value. A logical signal can indicate whether conditions on the second side of the structure are acceptable or unacceptable for a specific action, such as opening a launch tube door. The signal can be encoded to indicate one or more specific conditions related to a chemical on the second side of the structure. The signal can vary the output of the light source in some manner that can be provided to the light pipe 205.

The receiver assembly 250 includes an optical detector 280 joined to output electronics 285. The optical detector 280 should be capable of providing an electrical signal in response to a received optical signal. Optical detector 280 should be positioned to allow it to receive output from the optical medium. The output electronics 285 can be electronics that can extract or decode the received optical signal and provide an output signal. The output signal should be responsive to the signal generated by sensor. In one aspect, this can mean providing a signal giving the pressure on the second side of structure. Output electronics 285 can be joined to an output cable 290 to provide the output signal to other components.

Figure 3:
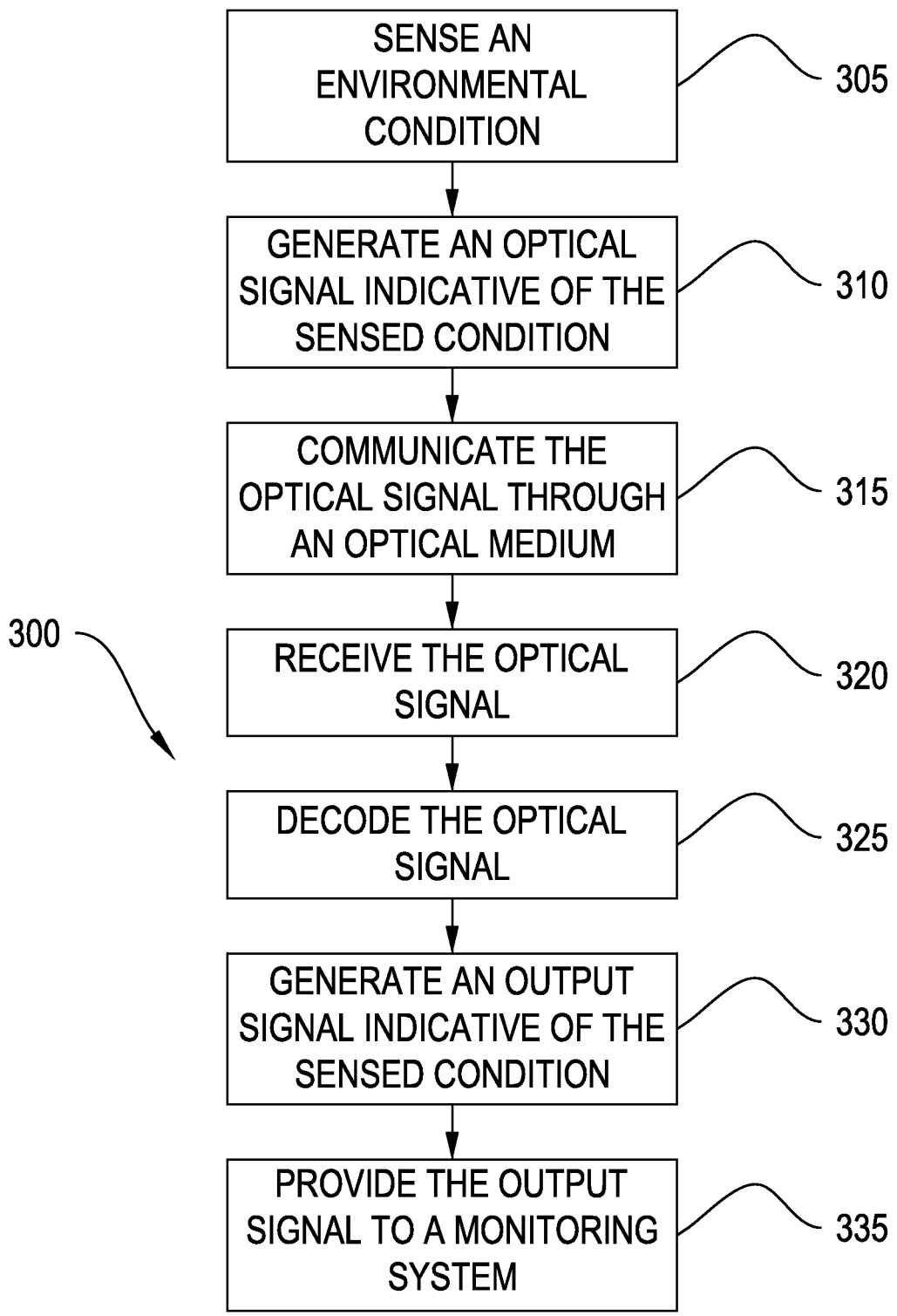
FIG. 3 is a flowchart diagram of an example method of providing optical data link according to various embodiments of the invention.

FIG. 3 is a flowchart of an exemplary method 300 of providing an optical data link according to various embodiments of the present disclosure. Aspects of the method 300 may be performed by one or more of the optical data link systems of FIGS. 1 and 2. The method starts at block 305 wherein an environmental condition of an inner chamber is sensed. In block 310 an optical signal indicative of the sensed condition is generated. The condition may be sensed utilizing one or more sensors and/or transducers positioned on the second side of the structure. The optical signal may be generated by an optical transmitter using a light source operating at a predetermined wavelength.

At block 315, the optical signal is communicated through an optical medium of a light pipe that is positioned in the structure. The structure can isolate the second side of the structure from the first side. The environmental conditions on the second side can be different from the environmental conditions on the first side. The light pipe can be configured so as to ensure that the conditions on the second side continue to be isolated, i.e., form a secure seal with the structure.

At block 320, the optical signal is received and decoded in block 325. These functions can be performed by a receiver assembly that can receive the optical signal and include circuitry, logic, etc., configured to extract the encoded information. According to certain embodiments, the information may be encoded in the optical signal via a series of light pulses having a predetermined duty cycle and/or a duty cycle that varies based on the information to be encoded. The receiver module can generate an output signal indicative of the sensed module in block 330 that is provided to a monitoring system at block 335.

Turning now to additional aspects of the present disclosure, provided are systems and methods that allow pressure or other measurement information to be transmitted through a wall or door which is equipped with an optical glass. The optical glass with LED or laser data can include send and receive electronics that allow the measured data to be transmitted without a physical penetration or conductor. According to certain aspects, the present disclosure may have a potential application in the measuring of pressure at the breech door of the torpedo tubes on submarines. Existing submarine classes have light pipes to view the inside of the launch or torpedo tubes to ensure they are gas filled before the breech door is opened. An upper and lower light pipe is in each tube. This concept may use the upper light pipe to transmit data.

Currently the optical glass in the breech door may be removed to allow for the transmission of the pressure data. This requires disassembly and disruption of the physical boundary and therefore creates risk to the components to damage during disassembly and reassembly. The present disclosure will not disrupt this pressure boundary but still allows for data transmission through the pressure containing wall.

The presently disclosed concept allows for transmitting optical signals through a door (or wall) using an light pipe as an optical wave guide. This is similar to fiber optic transmission methods where light of proper wavelengths are used to transmit signals. A sensing module and transmitter box with battery and sensing device (pressure, temperature, salinity, etc.) may be mounted on one side of the wall. On the opposite side is the receiver with cabling. The sensing module transmits the sensed data through the optical glass to the receiver, where it is decoded and made into an analog (voltage) signal to be sent by the receiver box down cabling. The signal can then be recorded using standard data acquisition methods.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A system for optical communication between environments having different pressures comprising:
   a structure separating the environments having a first low-pressure side and a second high-pressure side, said structure having an aperture formed therein extending from the first low-pressure side to the second high-pressure side, the aperture having a smaller diameter at the first low-pressure side and a larger diameter at the second high-pressure side with an intermediate shoulder intermediate between said smaller diameter and said larger diameter;
   a light pipe positioned in the aperture in said structure and conforming with the diameters thereof with a first end in communication with the first low-pressure side of said structure and a second end in communication with the second high-pressure side of said structure;
   a sensor in communication with the second high-pressure side of the structure to produce a sensor signal responsive to an environmental condition;
   transmitter electronics joined to said sensor to produce an electrical signal responsive to said sensor signal;
   a light source joined to said transmitter electronics and joined to said light pipe second end, said light source to produce an optical signal in response to said electrical signal from said transmitter electronics;
   an optical detector in communication with said light pipe first end to receive an optical signal; and
   receiver electronics joined to said optical detector to provide an output signal responsive to the optical signal received thereby.

2. The system of claim 1 wherein said light source is a light emitting diode.

3. The system of claim 1 wherein said light source is a solid state laser.

4. The system of claim 1 wherein said transmitter electronics provide a multiplexed digital signal.

5. The system of claim 1 wherein said transmitter electronics provide a serial signal.

6. The system of claim 1 wherein said sensor is at least one of the following a pressure sensor, a chemical sensor, a temperature sensor, a humidity sensor and a salinity sensor.

7. The system of claim 6 wherein said sensor is a pressure sensor.

8. The system of claim 6 wherein said sensor is a chemical sensor.

9. The system of claim 6 wherein said sensor is a thermometer.

\* \* \* \* \*